United States Patent
Alt et al.

(10) Patent No.: US 12,242,893 B2
(45) Date of Patent: Mar. 4, 2025

(54) RANKING COMPUTING RESOURCES

(71) Applicant: Advanced Micro Devices, Inc., Santa Clara, CA (US)

(72) Inventors: Max Alt, San Francisco, CA (US); Gabriel Martin, Extremadura (ES)

(73) Assignee: Advanced Micro Devices, Inc., Santa Clara, CA (US)

( * ) Notice: Subject to any disclaimer, the term of this patent is extended or adjusted under 35 U.S.C. 154(b) by 661 days.

(21) Appl. No.: 17/405,979

(22) Filed: Aug. 18, 2021

(65) Prior Publication Data
US 2022/0058060 A1 Feb. 24, 2022

Related U.S. Application Data

(60) Provisional application No. 63/067,047, filed on Aug. 18, 2020.

(51) Int. Cl.
*G06F 9/46* (2006.01)
*G06F 9/50* (2006.01)
(52) U.S. Cl.
CPC .................. *G06F 9/5027* (2013.01)
(58) Field of Classification Search
CPC .................................................. G06F 9/5027
See application file for complete search history.

(56) References Cited

U.S. PATENT DOCUMENTS

| | | |
|---|---|---|
| 7,617,498 B1 | 11/2009 | Lumsden |
| 8,286,177 B2 | 10/2012 | Hollingsworth |
| 8,296,419 B1 | 10/2012 | Khanna et al. |
| 2009/0006070 A1 | 1/2009 | Sasatani et al. |
| 2014/0089917 A1 | 3/2014 | Attalla et al. |
| 2016/0019636 A1 | 1/2016 | Adapalli et al. |
| 2017/0373940 A1 | 12/2017 | Shahab et al. |
| 2020/0073739 A1 | 3/2020 | Rungta et al. |

OTHER PUBLICATIONS

International Search Report and Written Opinion dated Nov. 15, 2021 for International Patent Application No. PCT/US21/44347.

*Primary Examiner* — Gregory A Kessler
(74) *Attorney, Agent, or Firm* — Fishman Stewart PLLC

(57) ABSTRACT

A system and method for ranking computing resources in a distributed computing marketplace is disclosed. Ranking may be based on the performance factors that the system predicts will have the greatest impact on the particular application the user plans to run. A performance database stores historical performance data for applications that have been executed on multiple different computer systems. The database is checked to see if the application, or one similar, has already been run on any of the computing systems participating in the distributed computing marketplace. If so, the existing performance data is used to predict which performance factors will have the greatest impact on the application. Those factors are then used to rank the available computing systems options for the user.

9 Claims, 16 Drawing Sheets

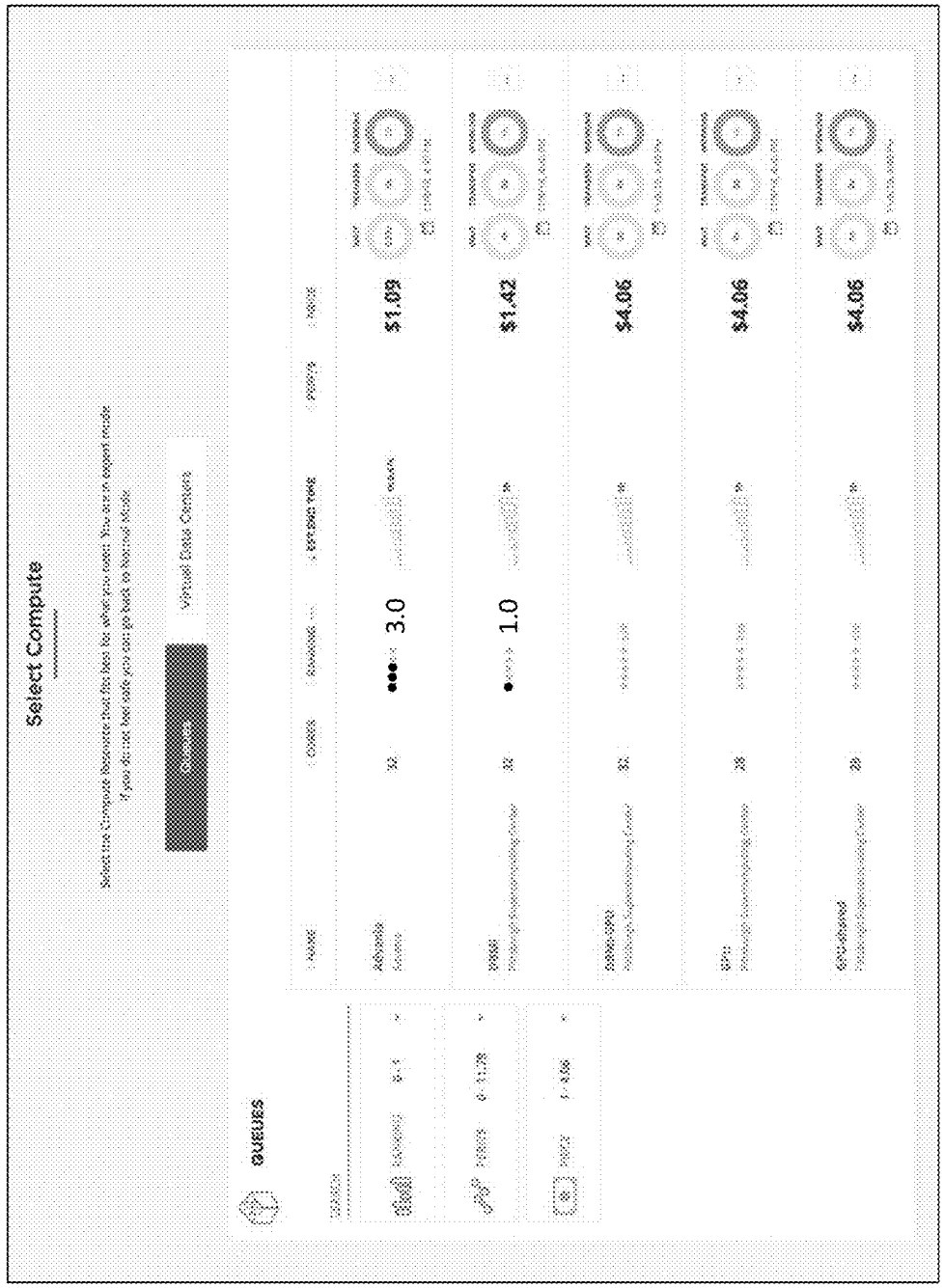
FIG. 11

RANKING COMPUTING RESOURCES

CROSS-REFERENCE TO RELATED APPLICATIONS

This application claims the benefit of, and priority to, U.S. Provisional Application Ser. No. 63/067,047, filed Aug. 18, 2020, the disclosure of which is hereby incorporated herein by reference in its entirety and for all purposes.

TECHNICAL FIELD

The present disclosure generally relates to the field of computing and, more particularly, to systems and methods for efficiently creating and managing application instances in computing systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing tasks such as machine learning (ML), artificial intelligence (AI), data mining, and scientific simulation (often called applications, jobs or workloads) frequently require large amounts of computing resources, including storage, memory, and computing power. As the time required for a single system or processor to complete many of these tasks would be too great, they are typically divided into many smaller tasks that are distributed to large numbers of computing devices or processors such as central processing units (CPUs) or graphics processing units (GPUs) within one or more computing devices (called nodes) that work in parallel to complete them more quickly. Specialized computing systems (often called clusters) that offer large numbers of nodes that work in parallel have been designed to complete these tasks more quickly and efficiently. Clusters can have different topologies (i.e., how compute resources are interconnected within a node or over multiple nodes). Groups of these specialized computing systems can be used together (both locally and remotely) to create large and complex distributed systems able to handle the highly complex computational workloads.

Properly setting up and configuring these computing systems can be difficult and time consuming for users. A typical end user may be a data scientist or artificial intelligence or machine learning specialist, not a systems engineer specializing in deployment. In a distributed computing marketplace environment, the user may have a large number of different computing systems and configurations to choose from to run their application. These may include bare metal systems, virtualized cloud-based instances, and large super computers and clusters, each with many options for how many CPUs, GPUs, etc. to use.

Determining which configuration is preferred amongst all these options is a complex and difficult process. For at least these reasons, there is a desire for an improved system and method for assisting users in selecting computing resource configurations.

SUMMARY

A system and method for ranking computing resources in a distributed computing marketplace is contemplated. By providing users with system resource options ranked according to the factors that have the greatest impact on the user's particular application and matter the most to the user, the difficult choice of which system configuration to use can be greatly simplified.

In one embodiment, the method comprises ranking a set of available computing resources by maintaining a performance database comprising historical performance data for a large number of prior applications that have been executed on many different computer systems with performance tracking enabled. The data from these prior runs is collected, analyzed, aggregated, and then stored into an application performance tracking database. When a user accesses the system to run an application, the database is checked to see if the application has already been run on any of the computing systems participating in the distributed computing marketplace. If it has already been executed, the existing performance data is used to determine which factors matter most to the application's performance, and those factors are used to rank the computing systems options available to the user to execute their application. If the application has not already been run on one or more of the available computing systems, the database may be checked for similar applications. If similar applications have been previously executed, their information may be used to select which factors are used for ranking the available computing systems.

If no similar applications are found, a test run of the application may be performed on one or more of the computing systems in order to collect performance data to characterize or profile the application. Even if the application cannot be tested on every possible computing system type or configuration available, with one or more test runs the collected performance data can be compared with prior applications in the database that have been run on all the available computing systems. Then the stored performance data for a similar application can be used to predict the performance of the user's application on non-tested systems by scaling the performance data received from the test run or runs.

If the system determines that a test run is not feasible or practical (e.g., too expensive or a testing system is unavailable) or did not produce useful performance data, the user may be asked to describe their application. For example, they may be prompted to select one or more application types from a set presented (e.g., 3D graphics rendering, image classification, object recognition, computational fluid dynamics, weather simulation, protein folding simulation, support vector machine), or by word descriptors (e.g., hashtags). This description/classification information may be used to select a similar application from the performance database in order to determine the most impactful performance factors and to rank the available computing system resources based on performance and suitability for the user's application.

In one embodiment, ranking may be performed based on an application performance spectrometer, a per-phase performance assessment (e.g., job performance breakdown), or on a single identified hot-spot driven performance factor. For example, the system may create a performance spectrometer for the application based on the test run, and then that may be compared with stored performance spectrometers for prior application in the database to find a similar application that can inform which performance factors are most impactful and should be used to rank computing system resources for the app.

The user may be presented with an interface having a control for selecting their own preferred criteria for ranking the available computing resources from a predefined set of criteria (e.g., cost, estimated time to job completion, availability or queue length, distance to location of datafile, predicted time to transfer data file to computing system, number of CPUs, number of GPUs, CPU-to-memory bandwidth/latency, GPU-to-memory bandwidth/latency, network bandwidth/latency, storage bandwidth/latency).

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 11 is an example user interface for selecting computation resources.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
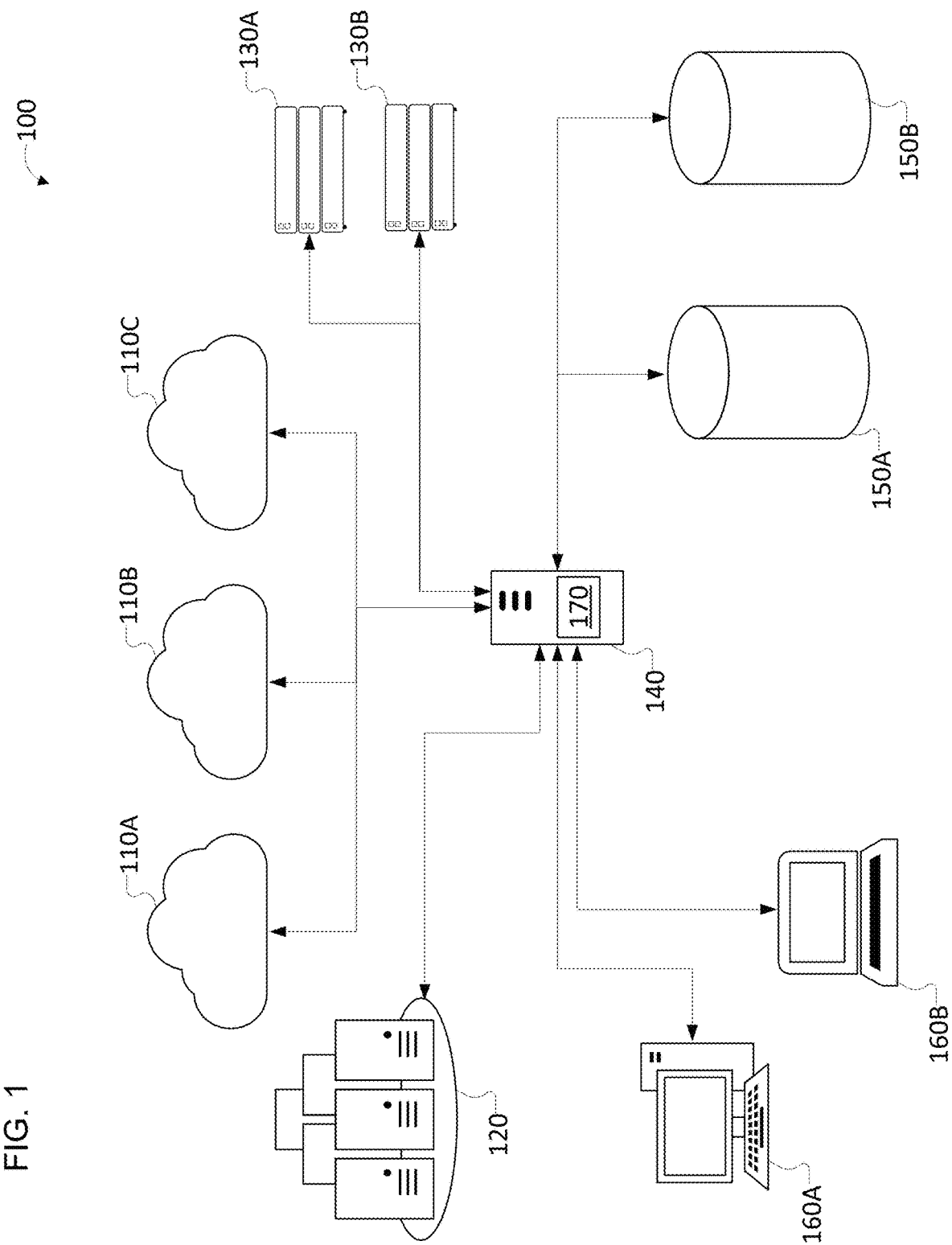
FIG. 1 is an illustration of one example of a system for intelligent scheduling of computing resources in a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from user devices 160A and 160B such as on-premises network-connected PCs, workstations, servers, laptops, or mobile devices via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a data center 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the management server 140, partly on management server 140 and partly on other computing devices in distributed computing system 100.

The management application 170 provides an interface to users (e.g., via a web application, portal, API server or command line interface) that permits users and administrators to submit applications/jobs via their user devices 160A and 160B such as workstations, laptops, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to management server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g. Kubernetes with Docker containers) or virtualized machines.

Unlike prior systems, management application 170 may be configured to provide users with information about the predicted relative performance of different configurations in the computing systems of cloud computing providers 110A, 110B, and 110C and bare metal systems in data center 120 and bare metal computing systems/devices 130A and 130B. These predictions may be based on information about the specific application the user is planning to execute. In some embodiments the management application 170 may make recommendations for which configurations (e.g., number of processors, amount of memory, amount of storage) best match a known configuration from the user or which bare metal configurations best match a particular cloud configuration.

Figure 2:
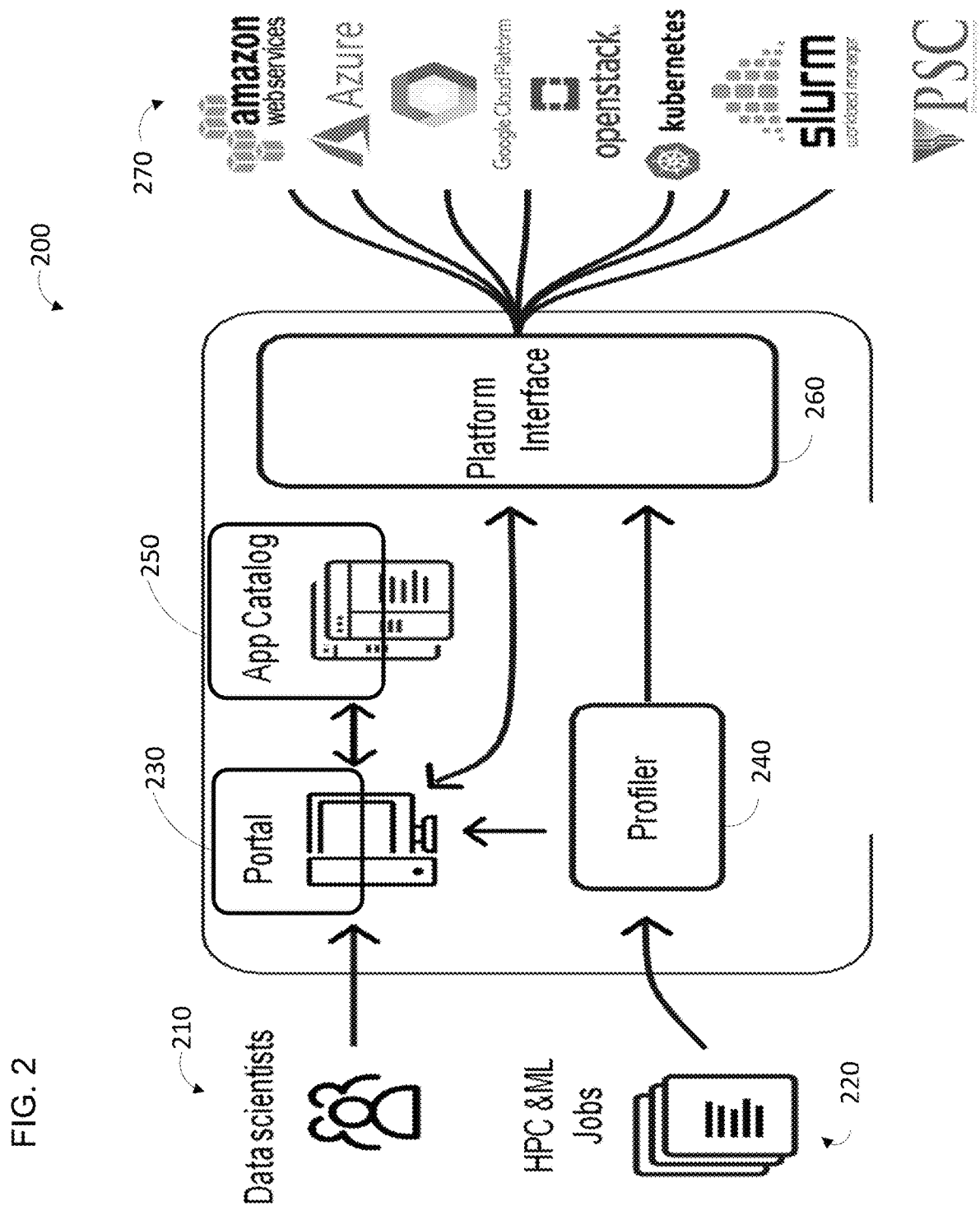
FIG. 2 is an illustration of one example of a system for creating application instances in a computing system.

Turning now to FIG. 2, an illustration of one example of a system for creating application instances in a computing system is shown. System 200 may for example be implemented using a management server executing a management application (e.g., such as management application 170 from FIG. 1). System 200 comprises different modules that enable users 210 to specify jobs (e.g., high performance computing and machine learning applications) 220 to be run on a distributed computing system (e.g. such as distributed computing system 100 from FIG. 1). One module is user interface module 230 which displays a portal that users can access to specify information about the application they want to run and provides controls to configure instances that will be used to run the application. Another is profiler module 240, which receives applications specified by the user and profiles them in order to assist with instance creation. Catalog module 250 provides users with a list of predefined containers configured for particular applications that the user might want to use. These may include containers previously configured by the user, as well as default containers for certain applications. For example, a user may have created their application as a Jupyter notebook (Jupyter is a popular open-source application that allows users to create and share documents that contain live code, equations, and visualizations), in which case they would select a preconfigured Jupyter container from catalog module 250.

Interface module 260 is configured to interface with various computing resources 270 including cloud computing services and bare metal computing systems.

Figure 3:
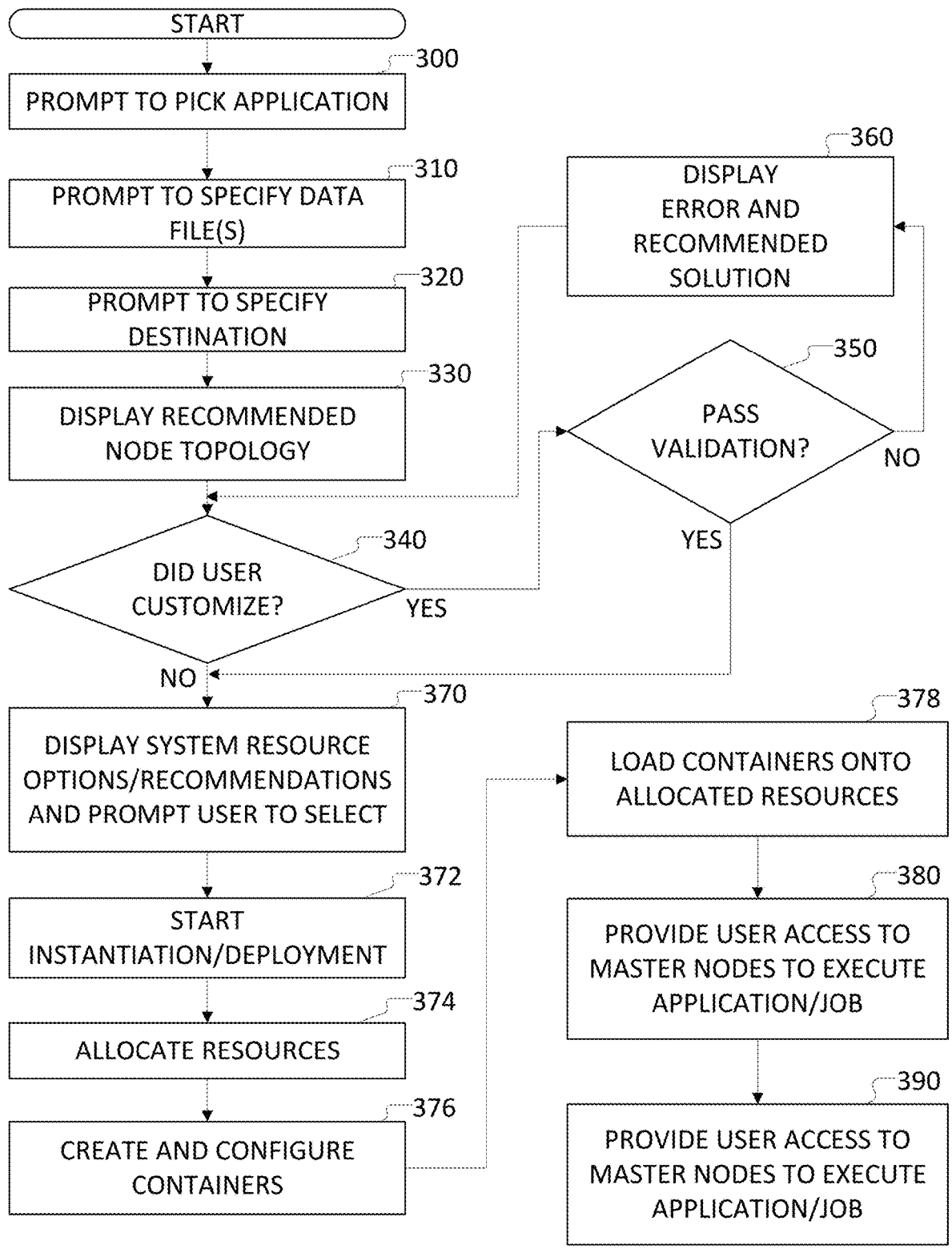
FIG. 3 is a flowchart of one example of a method for creating application instances in a computing system.

Turning now to FIG. 3, a flowchart of one example of a method for creating application instances in a computing system is shown. A user is prompted to specify an application (step 300). Using the example presented above the user would specify Jupyter as the application that they are using. There may be multiple options for a particular application. For example, an application (e.g., a Jupyter notebook) can be run in multiple modes, such as interactive or batch mode. Once the application has been specified, the user may be prompted to specify one or more data files to be used with the application (step 310). For example, a machine learning application that a data scientist has written might require training data sets or production data to be processed. Some applications may require an output location to be specified as well (step 320).

Based on the information input by the user, a recommended logical node or cluster topology is displayed (step 330). A logical topology is a high-level definition of how many processing nodes (e.g., master nodes and worker nodes) will be used and in what hierarchy they are connected and to what resources (e.g., memory, network, storage) they are connected to. The recommendation may, for example, be based on known requirements for the particular application selected (e.g., information stored when the application was entered into the application catalog). The recommendation may also be based on other information provided by the user (e.g., the size of the data file to be processed, the location of the data file to be processed, whether the application will be run in interactive mode or batch mode, etc.). Customer-specific business rules (e.g., geography-based restrictions or compute provider-based restrictions) may also be specified by the user and/or system administrator and applied.

The user may be given the opportunity to modify the recommended node topology (step 340). If the user modifies the topology, the system may perform a validation check on the changes (step 350), and display error messages and recommended solutions (step 360). For example, if the user overrides a recommended topology of one master node having four worker nodes to delete the master node, an error message may be displayed that each worker node requires a master node. Similarly, if the user configures too many worker nodes for a single master node (e.g., exceeding a known limitation for a particular application), an error message may be displayed along with a recommendation for how many additional master nodes are required.

If no changes are made by the user, or if the user's changes pass validation, system resource options (including indicators of which ones are recommended) may be displayed, and the user may be prompted to select the option that will be used to run the job (step 370). These system resources options may for example include a list of bare metal systems and cloud providers with instance options capable of executing the user's application with the logical topology specified. The determination of which resources to offer may be based on a set of computing resource configuration files that include the different options for each of the bare metal and cloud computing systems. For example, the configuration options for a particular cloud computing provider may include a list of all possible system configurations and their corresponding prices. In addition to pricing, it may also include relative performance information (e.g., based on relative execution times for one or more test jobs executed on each cloud system configuration). The system resource options and recommendations may be determined by comparing the application information provided by the user (e.g., application, data file size and location. etc.).

Estimated compute times (e.g., based on the test job most similar to the user's application) and projected costs may also be presented to the user along with system resource options. For example, the options may be presented sortable based on estimated cost or estimated time to job completion. The options may also be sortable based on best fit to the user's specified application and logical topology.

Once the user makes their selection, the application may be instantiated and deployed (step 372). The specific hardware to be used may be allocated (e.g., cloud instances may be created with Kubernetes or Docker) (step 374), and containers may be automatically created for the application in the configuration specified (step 376). This may for example include creation of master node containers and worker node containers that are configured to communicate with each other. Containers may include all necessary settings for the application to run, including configurations for ssh connectivity, IP addresses, connectivity to the other appropriate containers (e.g., connected master and worker nodes), etc. The containers may then be automatically loaded onto the appropriate allocated resources (step 378), and the user may be provided access (e.g., to a master node) in order to start the application (step 380). Once the application is running, performance may be monitored, and then feedback may be provided to the user (step 390).

Figure 4:
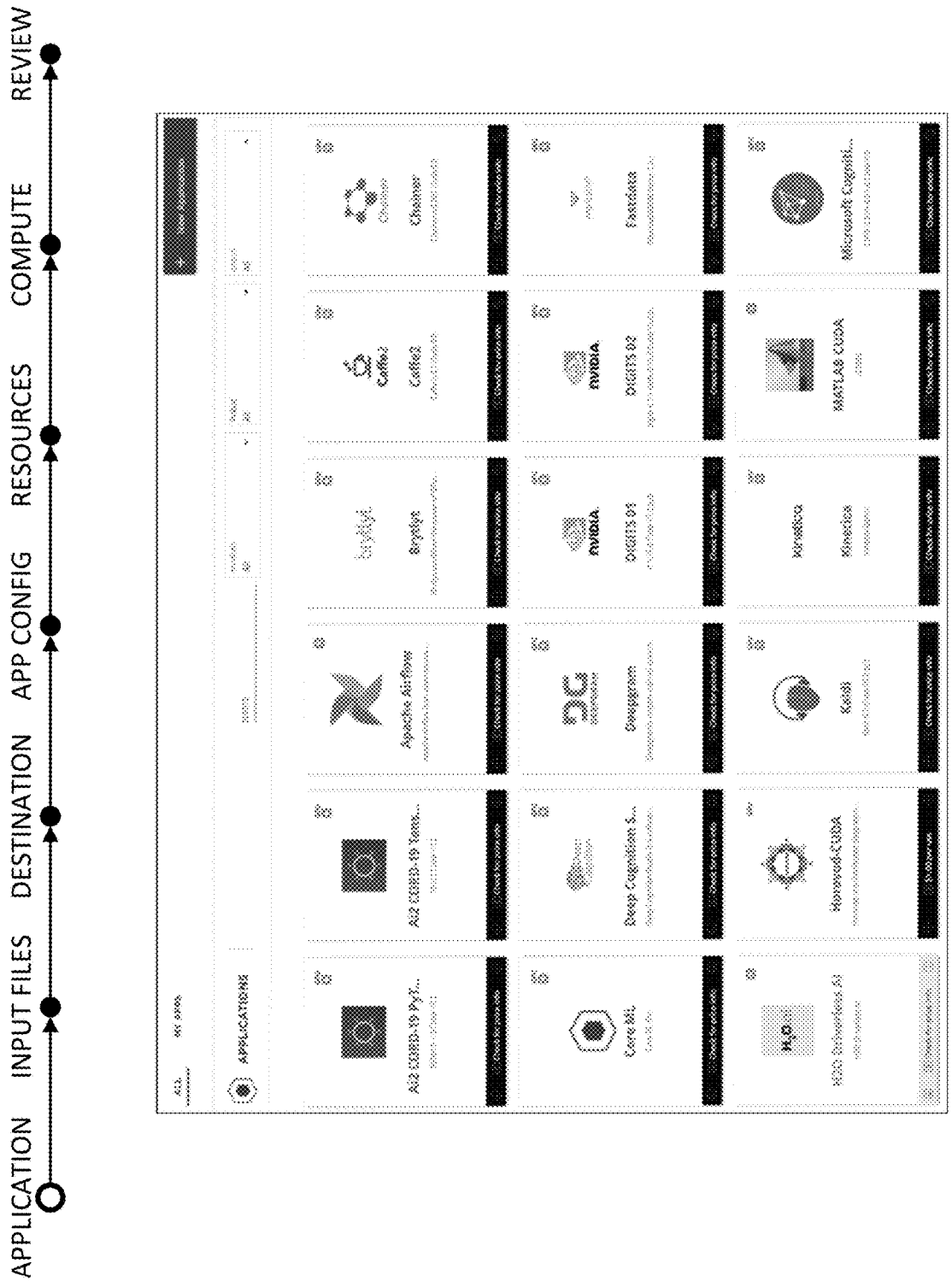
FIG. 4 is an example user interface for selecting an application.

Turning now to FIG. 4, an example user interface for selecting an application is shown. In this embodiment, a catalog of predefined application containers are presented to the user. As noted above, there may be multiple entries for a single application (e.g., interactive mode, batch mode), and the entries may be searchable and sortable by various criteria. So called "empty containers" (e.g., configured without an application but OpenMPI) may also be offered with the option for the user to specify their own application to load into it.

Figure 5:
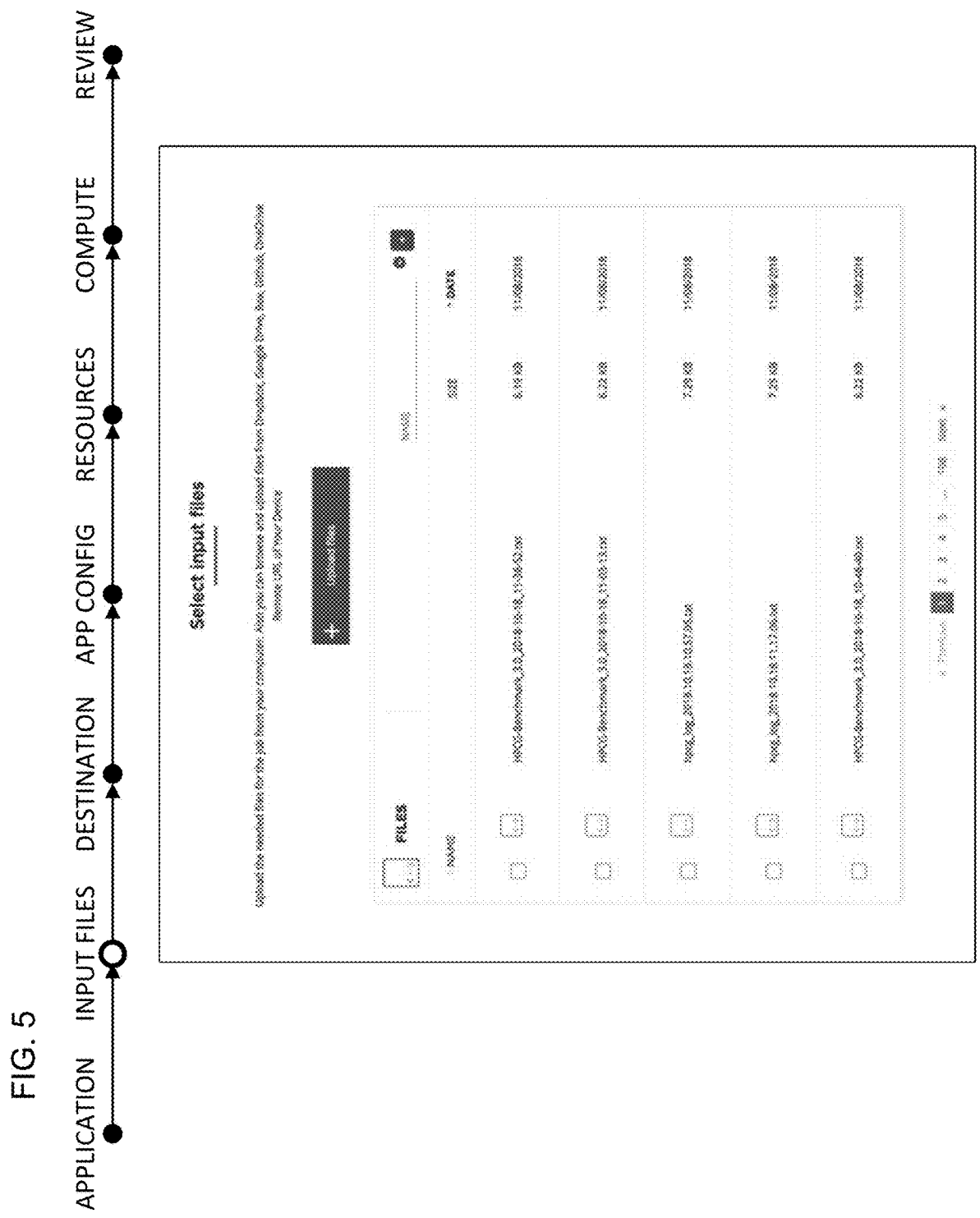
FIG. 5 is an example user interface for selecting input files.

Turning now to FIG. 5, an example user interface for selecting input files is shown. The user may specify an existing data file on their local machine, or a network location. The input files may be checked (e.g., for their file type, location, and size), which may be used by the system in making recommendations. For example, if the input files are very large, e.g., many terabytes, the time to transfer the files may impact the decision on where to run the application. Selecting a set of computer resources closer to the input files (or having a higher input/output network bandwidth) may be of increased importance for those instances.

Figure 6:
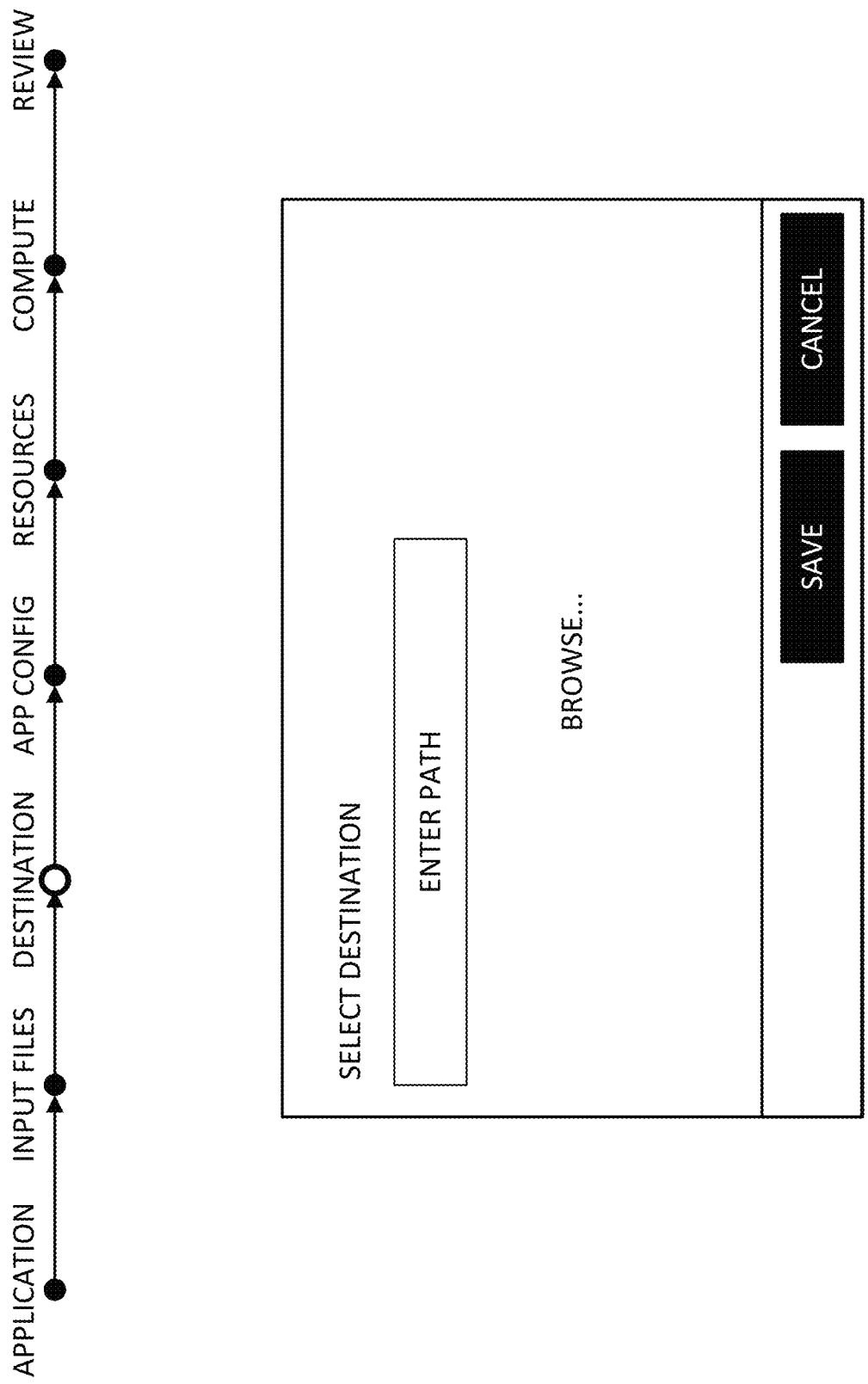
FIG. 6 is an example user interface for selecting a destination.

Turning now to FIG. 6, an example user interface for selecting a destination is shown. As with the input files, the user may specify a location such as their local machine, or a network location. The destination location may also be used by the system in making recommendations. Note that in each stage of the user interface, the information from the previous step may be used by the system to customize the options based on the user's prior input. For example, if the user specifies an application to be run in interactive mode, there may not be an output file and no prompt for a destination may be provided.

Figure 7:
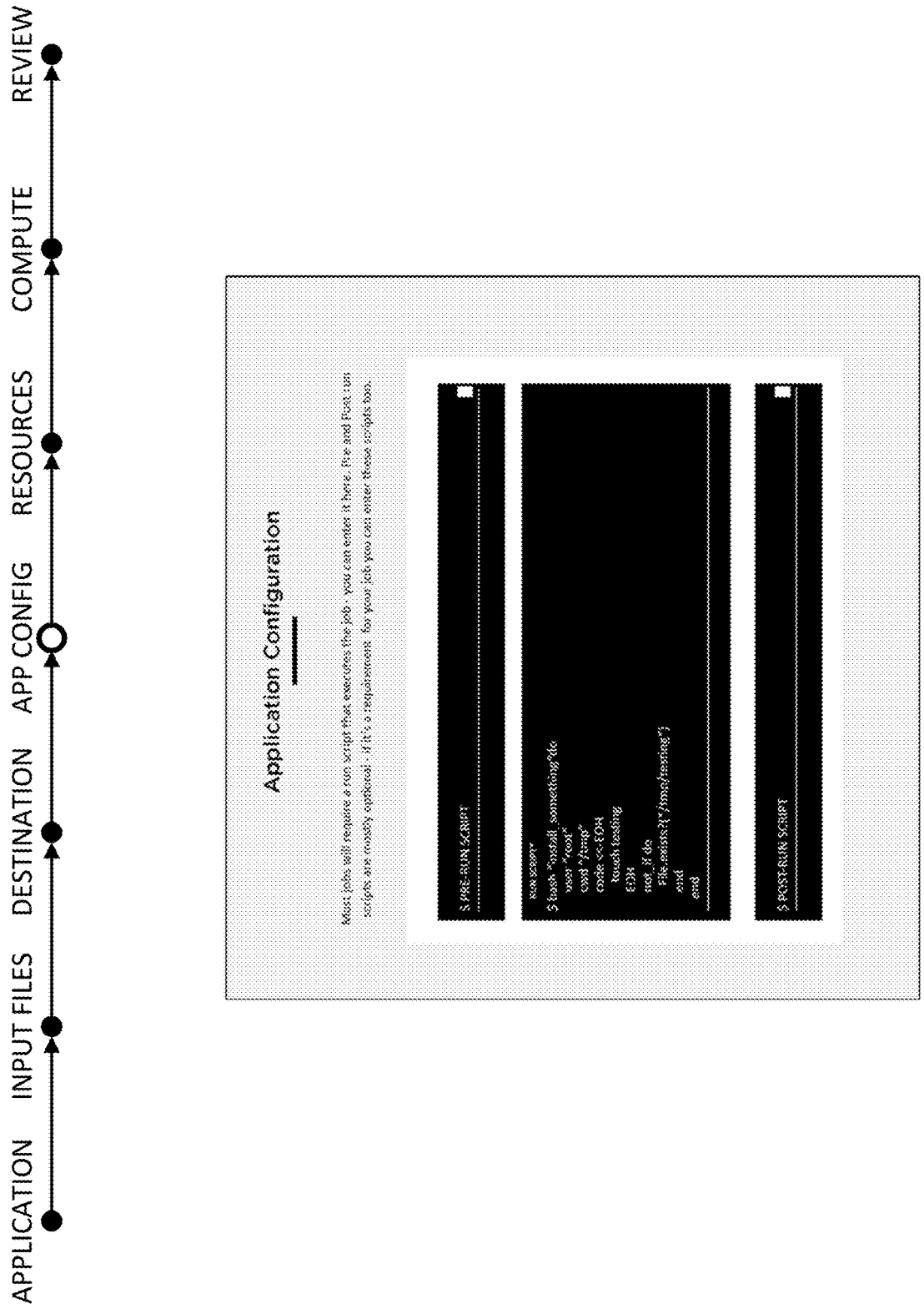
FIG. 7 is an example user interface for application configuration.

Turning now to FIG. 7, an example user interface for application configuration is shown. This may for example include an interface permitting the user to specify one or more scripts. This may for example include one or more pre-run scripts to be run before executing the application, one or more post-scripts to run after execution (e.g., compress the results before they are downloaded to the specified destinations) and an execution script to actually execute the application (e.g., when in batch mode).

Figure 8:
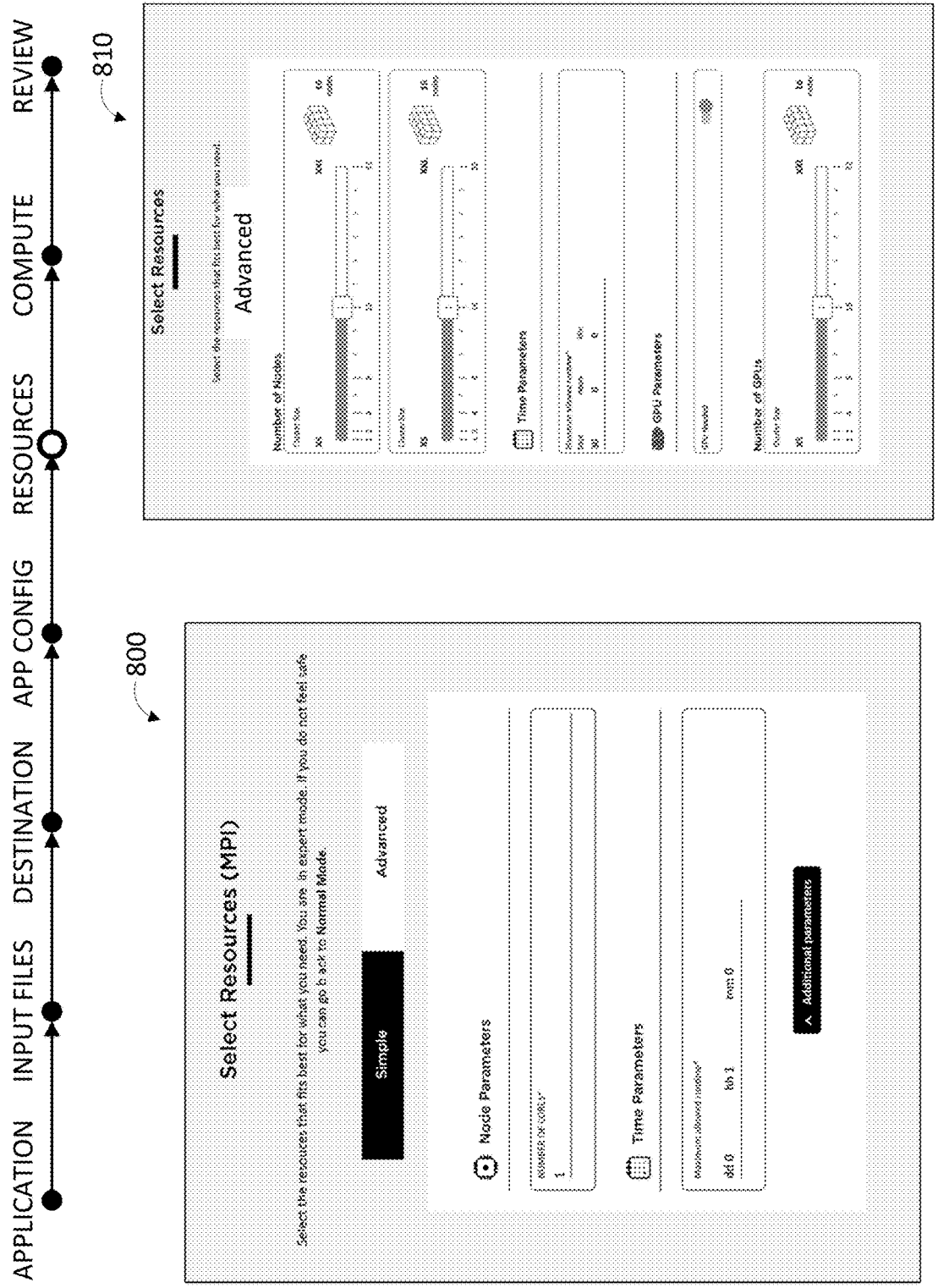
FIG. 8 is an example user interface for resource configuration.

Turning now to FIG. 8, example user interfaces for resource configuration are shown. In this example, controls permitting a user to select a logical topology are shown. In this embodiment, one of simple interface 800 or complex interface 810 are presented to the user based on their input. In each version, a recommended set of resources for the user-specified application are shown. For example, a recommended single node single core with a maximum runtime of 1 hour is presented in simple interface 800, while a recommendation of two clusters with 16 cores each is recommended in complex interface 810, along with a recommended maximum runtime of 30 days. A set of 16 GPUs are also recommended. The controls permit the user to change the configuration from the recommendation (subject to subsequent validation).

Figure 9:
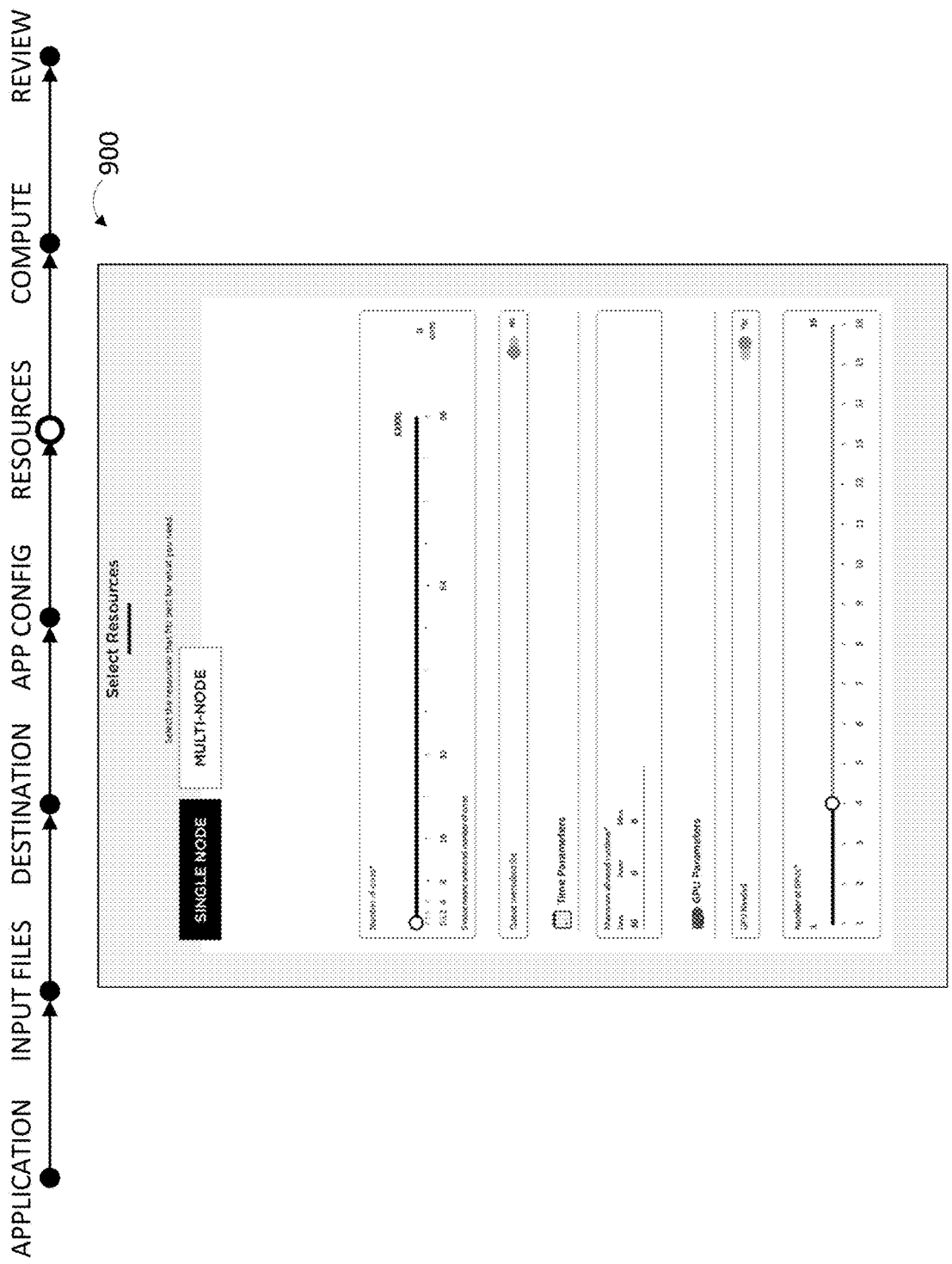
FIG. 9 is another example user interface for resource configuration.

Turning now to FIG. 9, another example user interface 900 for resource configuration is shown. In this example, tabs for single node and multiple node configurations are available, and the single node interface is selected. Based on the application the user selected, the data file, etc., a default or recommended configuration is shown. While a wizard-type interface is shown, in some embodiments, the user may be presented with a graphical configuration that is drag and drop with a what-you-see-is-what-you-get (WYSWYG) interface to create logical system definitions.

Figure 10:
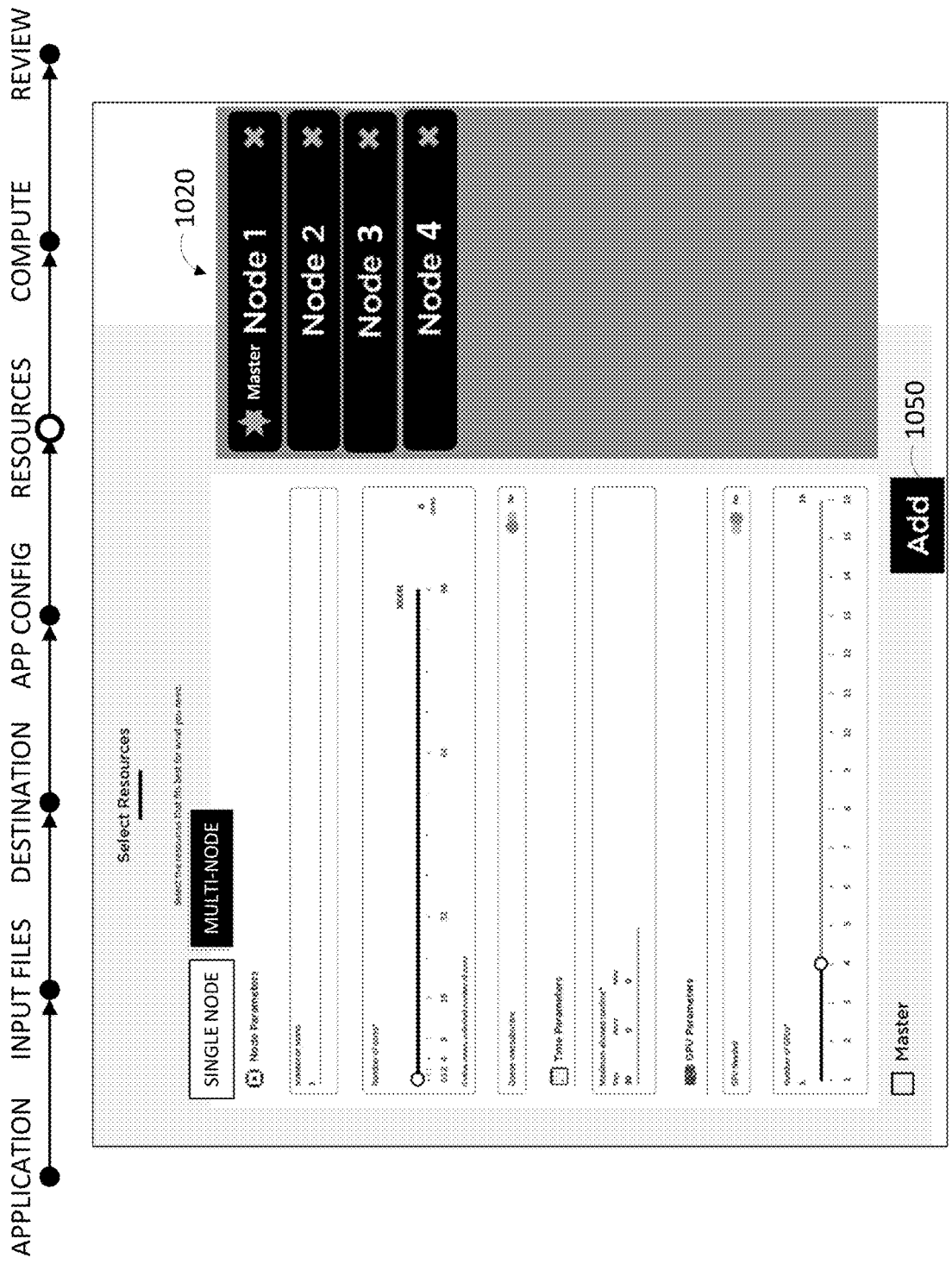
FIG. 10 is yet another example user interface for resource configuration.

Turning now to FIG. 10, yet another example user interface for resource configuration is shown. In this example, tabs for single node and multiple node configurations are presented, and the multi-node interface is selected. Nodes are listed in list 1020, with master nodes highlighted and worker nodes associated with each master node listed below. Nodes in list 1020 may be selected (e.g., clicked) to edit them (e.g., switch them between master and worker node roles). Worker nodes may be selected and dragged to change which master node they are associated with. In one embodiment, the user may be presented with controls to specify the minimum bandwidth or connection type (e.g., Mellanox ConnextX, RDMA, NVLINK, xGMI, GbE, 10 GbE, Inifiband SDR/QDR/NDR, etc.) between nodes. For example, the user may specify a minimum bandwidth of 100 Gbps between master and worker nodes, but only 10 Gbps between master nodes. The system may intelligently offer node types based on the application selected. For example, some applications utilize master and worker nodes, while others have parameter servers and clients. Other roles that may also be assigned include producer and consumer. Based on the application selected, the appropriate roles are presented as options for the user when creating new nodes or editing existing nodes. This permits the user to specify the logical roles for nodes separate from the process of selecting the physical computing resources.

In some embodiments, the management application may include support for creating and specifying different roles for nodes and multiple application instances with multiple data sets. For example, a user may create a TensorFlow application to identify objects using a gradient descent and Horovod to identify objects. Gradient descent is an optimization algorithm that is used when training a machine learning model, and Horovod is an open source distributed deep learning framework for TensorFlow, which is an end-to-end open-source platform for machine learning. The user might create a Jupyter notebook with Python to set parameters and do training, and then they might deploy their application on a Kubernetes cluster for production. In this example, the user might first deploy a first instance that acts as a consumer (e.g., the Jupyter notebook on a single node), and a second instance for training and prediction (e.g., a multi-node configuration with a Horovod master/controller node and four worker nodes that perform the gradient descent). In this example, the user would have six instances of the same application (i.e., the notebook, the master node that controls Horovod, and four worker nodes performing Horovod). The user may be presented with a graphical interface (e.g., WYSIWYG) with a tool palette for specifying the roles of each application instance, relationships between the nodes and their roles, with visual representations of input, output, etc. Once completed, the management application may provide the user with another interface with which to apply the multi-instance logical topology to actual computing resources available in the distributed computing system (e.g., bare metal and cloud computing systems).

A default configuration for multi-node configurations may also be presented based on the application selected. For example, if the user has specified a Jupyter application, the recommended default configuration presented may be a multi-node configuration with one master and four workers (as shown in the figure). However, the user may adjust the recommendation and configure one or more additional nodes using the controls presented and clicking the Add control 1050. The configured node is then added to the configuration with all the specified parameters (and appears in list 1020). The user may click on one of the added Nodes to edit the parameters for just that one node (e.g., if needed for asymmetrical workloads).

In some embodiments, small (e.g., single node), medium (e.g., multi-node), and large (e.g., multi-node, multi-master) recommended configurations may be offered to the user. The recommendations may be determined by the system based on preconfigured information specifying the relationship between the nodes or containers used by an application for certain tasks. For example, a particular application's nodes (e.g., containers) may have certain characteristics that are independent of deployment. For example, one node might act as a producer node while another might act as a consumer. Given this producer to consumer relationship, a certain amount of communication will be required between the nodes. Based on that amount of communication (e.g., known by profiling the application before its default containers are created), the management application may be configured to recommend configurations that are better suited to that application. If the producer-consumer relationship typically generates a large amount of traffic that is latency sensitive or bandwidth sensitive, the management application may recommend configurations with low latency and or high bandwidth interconnections. This information may be used not only for recommending logical topologies, but also for subsequent stages involving the selection of the actual compute resources upon which the logical topology is created. It may also be used for validation after the user customizes the default or recommended configurations for an application.

In some embodiments, an expert mode may also be offered (e.g., for expert users or users that want to experiment). In this mode, verification or checking may be relaxed and additional controls (e.g., minimum memory per node) may be presented. In one embodiment, the expert mode may permit the user to visually edit (or draw/create) a desired cluster topology by selecting components from a palette of components (including nodes, node roles, CPUs, GPUs, memory, interconnects, network connections, storage, etc.) and connecting them visually (e.g., clicking and dragging interconnects between them). This can include software defined networking and restrictions (e.g., this set of nodes must all be on the same cluster). If a multi-container configuration is being configured, the user may visually define the application by specifying the relationship between containers. Once completed, the user may submit the proposed configuration to the system, and the system may find the best match for deployment from all the computing resources known to it.

Feedback may be provided to the user by the management application for both logical topology and compute resource selections. For example, a warning may state that a particular configuration does not scale well, or that no systems exist with enough nodes to satisfy the configuration the user has created in expert mode. For example, the system may warn the user that a high bandwidth interconnect is needed (e.g., based on a particular producer-consumer configuration) if the user has not selected a high bandwidth link. These types of recommendations/feedback can be determined by the system based on preconfigured application information (entered when the template application container is initially created) and based on historical application performance data previously observed by the system.

Turning now to FIG. 11, an example user interface for selecting computation resources is shown. In this example, different computing resource options (e.g. bare metal systems and cloud compute systems) matching the resources needed by the application topology configured are presented to the user. One or more recommended options may be highlighted (e.g., with a recommended tag or star), and the options may be sorted based on price, performance per price, or based on how well the option is predicted to meet the user's requirements (e.g., on a 5-point scale). For sorting, the system may be configured to calculate cost based on predicted execution time, including wait, setup and transfer times based on the information input by the user. Once the user selects one of the options, the application may be instantiated and deployed to the selected computing resources.

Figure 12:
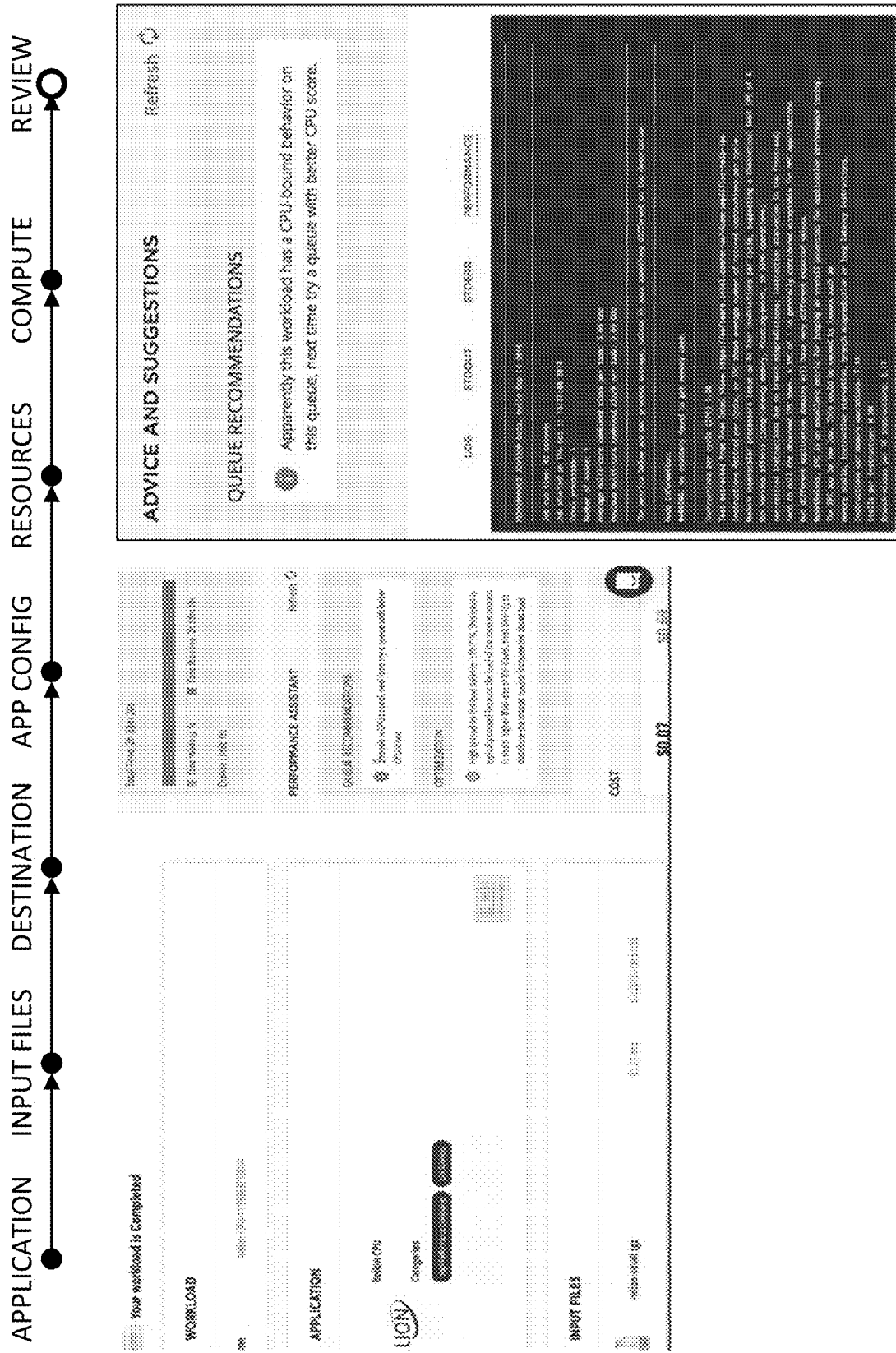
FIG. 12 is an example user interface for providing feedback on instance configurations.

Turning now to FIG. 12, an example user interface for providing feedback on instance configurations is shown. When the application is running, performance data (e.g., instructions counters—if available, cycles counter, page-faults, and context-switches) may be tracked. For example, performance tracking programs may be included in the containers that are automatically created by the system. Based on the performance data collected, recommendations for improving performance on subsequent runs of the application may be presented to the user. For example, if the application spent significant time with 100% CPU utilization, the system may recommend adding additional CPUs for future runs.

Figure 13:
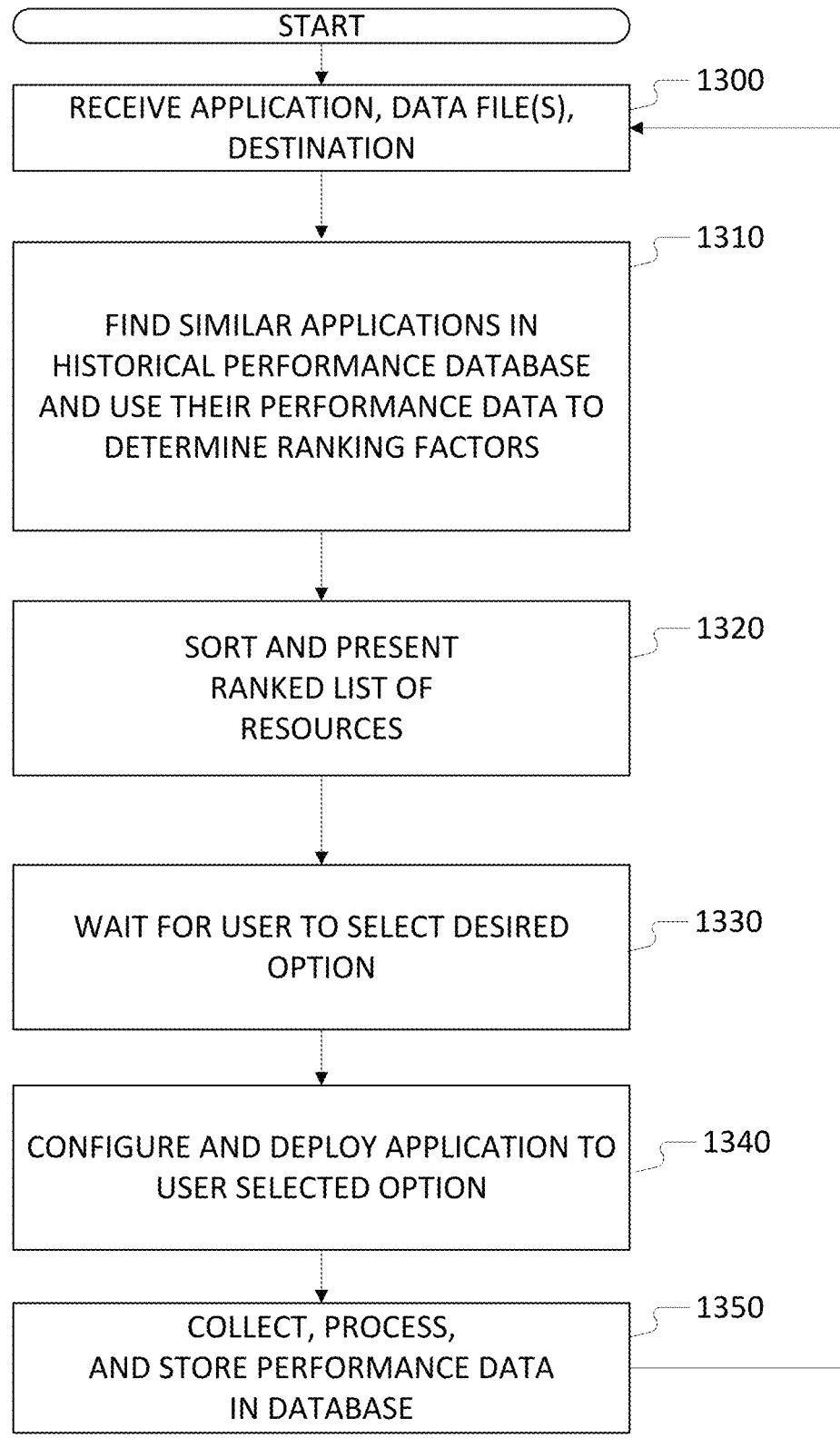
FIG. 13 is a flowchart of an example of a method for ranking computing resources in a distributed computing marketplace.

Turning now to FIG. 13, a flowchart of an example of a method for creating application instances in a computing system is shown. In this embodiment, the user's application is received (step 1300) along with the associated data files (e.g., network locations), and a location for whether the output or results of the application are to be stored. If the data files are large, the location of the data relative to the computing resources executing the application can play a significant factor in the total time required to complete the job. Additional information may also be captured (e.g., what type of application is it, what unit of work and size (e.g., a 3D graphics rendering program requiring rendering of 10,000 3D objects).

A historical application performance database may be searched to find performance data for prior executions of the application (if any exist), or for one or more similar applications. The historical data for example may include what percentage of time the application spent bound by different performance limits such as being CPU-bound, network-bound, I/O bound, memory latency bound, memory bandwidth bound, etc. Based on this information, the most impactful performance limiting factor may be identified and used to rank the available computing resource's suitability for executing the user's application (step 1320). Once the user has selected one of the options (step 1330), the user's application may be configured and deployed (step 1340) to the selected computing system resource (e.g., a container with the user's application may be created and copied over to the selected computing system resource). Part of this configuration process may include installing/enabling performance monitoring for the user's application. Once the application has run, the performance data may be collected, aggregated, and stored in the historical performance database.

Figure 14:
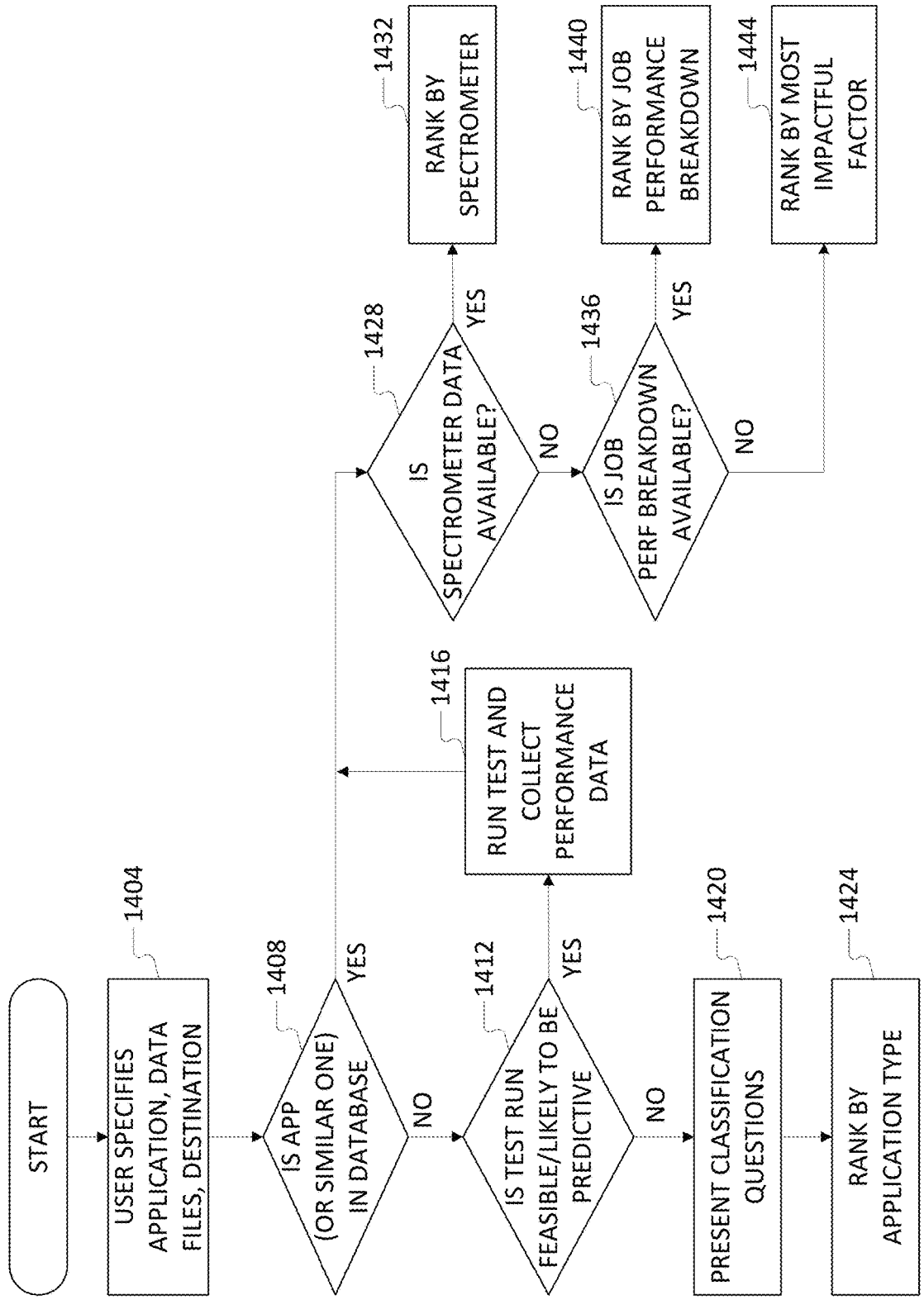
FIG. 14 is a flowchart of another example of a method for ranking computing resources in a distributed computing marketplace.

Turning now to FIG. 14, a flowchart of another example of a method for creating application instances in a computing system is shown. In this embodiment, the user specifies their application along with any associated data files (e.g., size, network location), and a location for whether the output or results of the application are to be stored (step 1404). A performance history database is checked for performance data for the application or for similar applications (step 1408). For example, if the application is new but uses a particular image recognition library, historical performance history data for prior applications using the same image recognition library may be used. If no similar application can be found (e.g., not enough information about the user's new application is known), a determination may be made as to whether a test run of the new application can be run (step 1412). If possible, a short test run of the application is performed on one or more of the available computing resources, and performance data is collected and stored in the database (step 1416). If a test run is not possible, the user may be prompted with one or more classification questions. For example, the user may be presented with a table or hierarchical listing of different application types (e.g., 3D graphics rendering, computational fluid dynamics, neural network for object identification, etc.), or the user may be presented with a list of hashtags to select from that best describe their application. Based on the type of application specified, similar applications in the performance database can be identified, or a benchmark present in the performance database and representative of that type of application may be used to determine the most impactful performance limiting factor or factors, and then the available computing resources may be ranked according to their performance on that factor (step 1424).

If the user's application is not new or is new but has successfully completed one or more test runs, the highest resolution data available may be used for predicting the most likely performance limiting factor and ranking the available computing resources. For example, if a performance spectrometer (e.g., histograms of different performance counters) is available (step 1428), it may be used for finding the most similar application in the performance database, and to predict the computing resources most likely to have the best performance on the most impactful performance limiting factors (step 1432). Alternatively, if a job performance breakdown is available for the user's application (step 1436), then that may be used for finding the most similar application and for ranking the computing resources (step 1440). Otherwise, if a simple hot spot analysis was performed in the test run (or if that is all that is available in the performance database), the single most impactful performance limiting factor may be used to rank the computing resources (step 1444).

Figure 15:
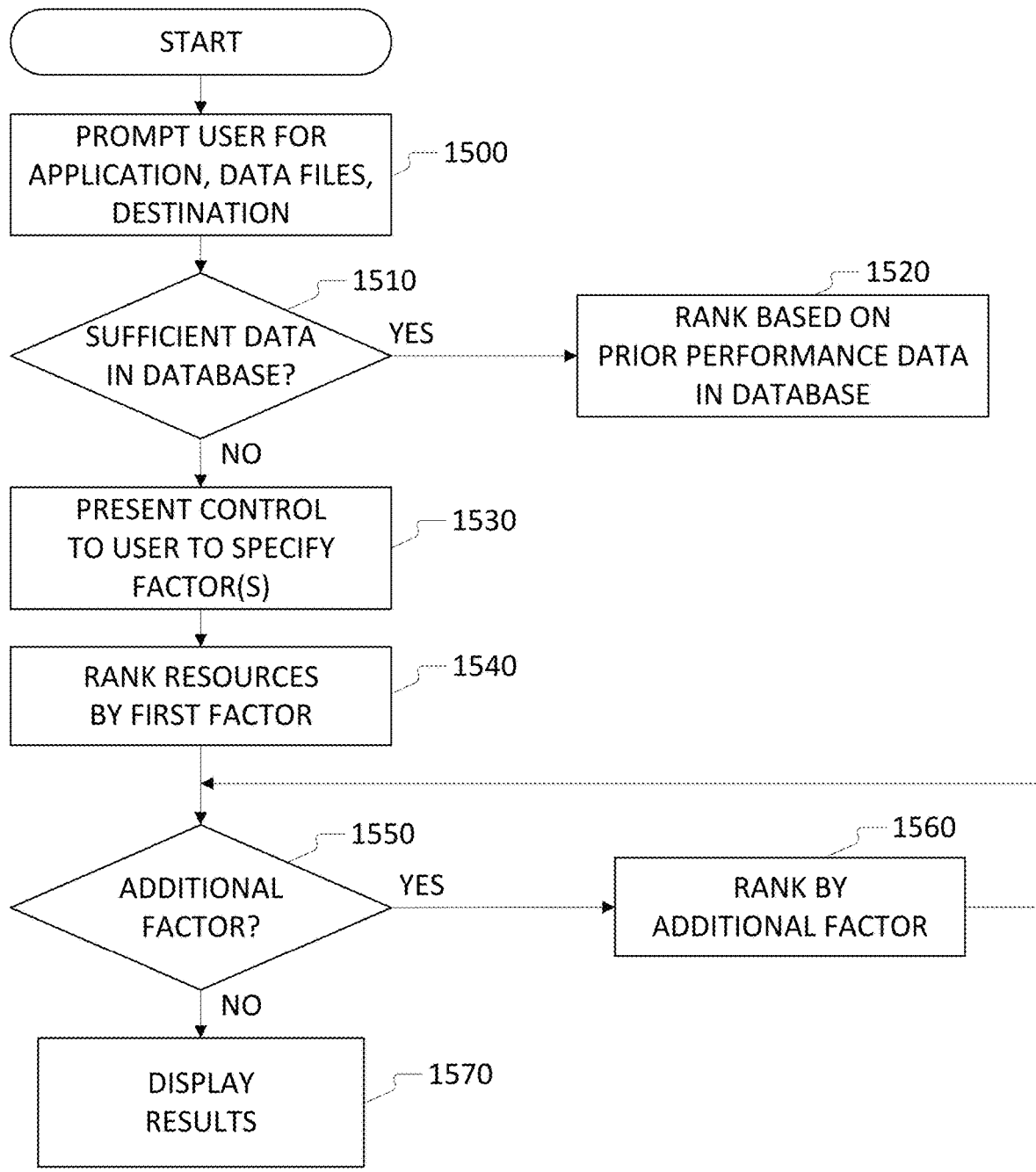
FIG. 15 is a flowchart of another example of a method for ranking computing resources in a distributed computing marketplace.

Turning now to FIG. 15, another example method for ranking computing resources is shown. In this embodiment, the method comprises prompting the user to enter the application, data files, and a destination for the output (step 1500). If there is sufficient historical performance data for the application in the performance database (step 1510), the available computing resources in the computing network are presented in a ranked order based on that historical performance data (step 1520). If there is insufficient data, the user is prompted to specify one or more performance limiting factors of concern for their application (step 1530). For example, the user may know that their application requires significant processing and so may specify CPU as a first limiting factor and CPU-to-memory bandwidth as a second limiting factor. The available resources in the computing network may then be ranked based on the first factor (step 1540). If additional factors were entered by the user (step 1550), those additional factors may also be used to rank the computing resources, e.g., each at a reduced weight relative to earlier factors (step 1560). Once all the specified factors have been considered, the results may be displayed to the user (step 1570) so that the user may select one or more computing resources where they want their application to be deployed. The application may be configured for performance data capture as part of deployment so that the next time the user runs the application (or a similar one), there may be sufficient data in the database to rank the computing resources based on the most impactful factors as measured.

Figure 16:
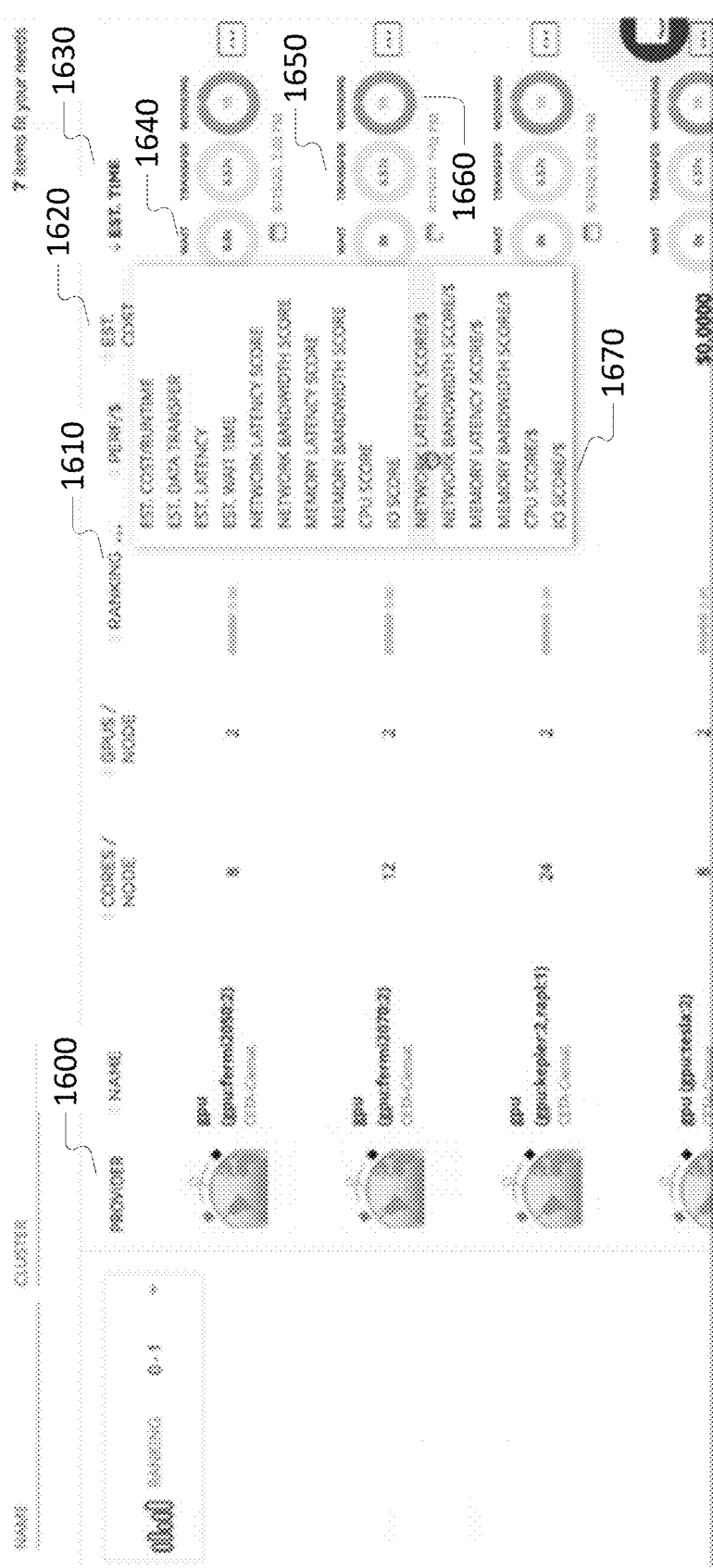
FIG. 16 is another example user interface for selecting ranked computation resources.

Turning now to FIG. 16, another example user interface for selecting ranked computation resources is shown. In this embodiment, the available resources matching the requirements of the user's application are presented in table format. Each provider name is listed in a column 1600 along with the particular system configuration name, number of CPUs per node, number of GPUs per node, a ranking 1610, an estimated cost 1620, and an estimated completion time 1630. In one embodiment, a breakdown of how much time is estimated to be spent in waiting 1640, transferring data 1650, and working 1660 is shown as well. The user may be presented with a control (e.g., a drop-down menu) that permits the user to select which criteria should be used to rank the system resources (e.g., based on estimated cost per runtime, estimated data transfer, estimated latency, estimated wait time, network latency or bandwidth performance scores, memory latency or bandwidth performance scores, CPU score, I/O score, network latency or bandwidth score per dollar, memory latency or bandwidth score per dollar, CPU performance score per dollar, or I/O performance score per dollar). The performance scores may be for the user's application itself if it was already executed on the computing resource, for a similar application, or for a common benchmark that was executed on all the computing resources.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A non-transitory, computer-readable storage medium storing instructions executable by a processor of a computational device, which when executed cause the computational device to:
   maintain a performance database comprising historical performance data for a plurality of prior applications executed on a plurality of different computer systems;
   present a user with a control to specify an application to instantiate;
   identify whether a match for the application or a similar application is present in the performance database, and if the match is present, rank a set of available computing system options for executing the application based on one or more most impactful factor identified by the match's historical performance data;
   when the match for the application or the similar application is missing, identify whether a test run of the application is feasible and indicative of runtime performance; and
   in response to the test run of the application being feasible and indicative of runtime performance, run at least one test of the application to collect performance data for the application.

2. The non-transitory, computer-readable storage medium of claim 1 storing further instructions to cause the computational device to rank a set of available resources based on the at least one test of the application when the test run is feasible and indicative of the runtime performance, wherein the test run of the application is feasible when a testing system for the application is available, and wherein the match for the application or the similar application is present in the performance database when the performance data for the application or the similar application is present the performance database.

3. The non-transitory, computer-readable storage medium of claim 1, wherein the ranking of the set of available resources is further based on historical performance data for the similar application in the performance database.

4. The non-transitory, computer-readable storage medium of claim 3, wherein the ranking is performed based on an application performance spectrometer.

5. The non-transitory, computer-readable storage medium of claim 2, wherein the ranking is performed based a per-phase performance assessment.

6. The non-transitory, computer-readable storage medium of claim 1 storing further instructions to cause the computational device to display an estimated cost for executing the application on available computing resources.

7. A system comprising at least one processor and memory, the system configured to:
   receive a selection, from a user, of an application to instantiate;
   identify whether historical performance data for the application or a similar application is in a performance database;
   when the historical performance data for the application or the similar application is in the performance database, rank available computing system options for executing the application based on one or more most impactful performance factors determined from the historical performance data;

when the performance database is free of the historical performance data for the application or the similar application, identify, via the at least one processor, whether a test run of the application is feasible and indicative of runtime performance; and when the test run for the application is feasible and indicative of runtime performance, run, via the at least one processor, at least one test of the application to collect performance data for the application.

8. The system of claim 7, further configured to rank a set of available resources based on the performance data collected via the test run.

9. The system of claim 7, wherein the test run of the application is feasible when a testing system for the application is available.

* * * * *